US012689560B1

(12) United States Patent
Thompson et al.

(10) Patent No.: US 12,689,560 B1
(45) Date of Patent: Jul. 21, 2026

(54) DISCOVERY OF VIRTUAL COMPUTING INFRASTRUCTURE

(71) Applicant: ServiceNow, Inc., Santa Clara, CA (US)

(72) Inventors: Christopher Richard Thompson, San Diego, CA (US); Harshith Gundappa, San Diego, CA (US); Satya Kiran Noolu, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 38 days.

(21) Appl. No.: 19/032,956

(22) Filed: Jan. 21, 2025

(51) Int. Cl.
*H04L 41/12* (2022.01)

(52) U.S. Cl.
CPC ................................... *H04L 41/12* (2013.01)

(58) Field of Classification Search
CPC ...................................................... H04L 41/12
See application file for complete search history.

(56) References Cited

U.S. PATENT DOCUMENTS

| | | | | |
|---|---|---|---|---|
| 8,903,954 | B2 * | 12/2014 | Luna | H04L 69/28 |
| | | | | 709/219 |
| 9,015,710 | B2 * | 4/2015 | Spivak | H04L 41/0806 |
| | | | | 718/1 |
| 10,389,589 | B2 | 8/2019 | Grisco | |
| 10,581,689 | B2 | 3/2020 | Moguel | |
| 10,673,963 | B1 | 6/2020 | Feiguine et al. | |
| 10,708,753 | B2 | 7/2020 | Garty | |
| 10,749,943 | B1 | 8/2020 | Feiguine et al. | |
| 10,819,586 | B2 | 10/2020 | Biran | |
| 10,824,650 | B2 | 11/2020 | Bar Oz et al. | |
| 10,826,842 | B2 | 11/2020 | Millin | |
| 10,931,774 | B2 | 2/2021 | Tal | |
| 10,963,314 | B2 | 3/2021 | Bar Oz | |
| 11,032,381 | B2 | 6/2021 | Feiguine | |
| 11,089,115 | B2 | 8/2021 | Garty et al. | |
| 11,095,506 | B1 | 8/2021 | Erblat et al. | |
| 11,240,241 | B2 | 2/2022 | Bitterfeld | |
| 11,277,475 | B1 | 3/2022 | Tal et al. | |

(Continued)

FOREIGN PATENT DOCUMENTS

CN        101335649  A  *  12/2008

OTHER PUBLICATIONS

Servicenow, Xanadu IT Operations Management, Dec. 26, 2024.
International Search Report and Written Opinion, PCT Application PCT/US2025/056125, mailed Mar. 25, 2026.

*Primary Examiner* — G. C. Neurauter, Jr.
(74) *Attorney, Agent, or Firm* — McDonnell Boehnen Hulbert & Berghoff LLP

(57) ABSTRACT

The embodiments herein may involve: obtaining, by a proxy server, one or more commands to be executed for discovery of computing resources within a computing platform; providing, by the proxy server, a representation of the one or more commands to a system management service within the computing platform, wherein the one or more commands instruct the system management service to store results of execution of the one or more commands in a storage service with the computing platform; repeatedly querying, by the proxy server, the system management service for an indication that the execution of the one or more commands is complete; and retrieving, by the proxy server, results of the execution of the one or more commands from the storage service.

20 Claims, 12 Drawing Sheets

(56)  References Cited

U.S. PATENT DOCUMENTS

| | | | |
|---|---|---|---|
| 11,288,250 B2 | 3/2022 | Tal | |
| 11,347,806 B2 | 5/2022 | Tal | |
| 11,418,586 B2 | 8/2022 | Subramaniam | |
| 11,431,568 B2 | 8/2022 | Bar Oz | |
| 11,582,106 B2 | 2/2023 | Hameiri et al. | |
| 12,079,640 B1 | 9/2024 | Hevenor | |
| 12,231,508 B2 * | 2/2025 | Kumar | H04L 41/069 |
| 2019/0342156 A1 * | 11/2019 | Dhuleshia | H04L 41/0213 |
| 2019/0349424 A1 | 11/2019 | Reddy | |
| 2021/0194764 A1 | 6/2021 | Badyan et al. | |
| 2023/0208710 A1 | 6/2023 | Hail | |
| 2023/0409304 A1 * | 12/2023 | Vemulapalli | G06F 9/451 |
| 2024/0231919 A1 | 7/2024 | Bar Oz | |

* cited by examiner

900

```
$secure = aws ssm get-parameter --name /
servicenow/cmdb_ci_db_mysql_instance/alice
--with-decryption --query Parameter.Value -
-output text
```

902

```
cmd.exe /c '"C:\Program Files\MariaDB 10.2\
bin\mysqld.exe" --user=alice@localhost --
password=''$$password$$'' --port=3306 --
skip-column-names --silent-startup --
execute="SHOW ENGINE NDB
STATUS;;"'.replace('$$password$$',$secure)
```

FIG. 9

```
{
    "schemaVersion": "2.2",
    "description": "Run SSH Command",
    "parameters": {
        "commands": {
            "type": "StringList",
            "description": "(Required) Specify a shell script or a command to run.",
            "minItems": 1,
            "displayType": "textarea",
            "allowedPattern": "whoami|uname -a|^\\w+ dmidecode -t i \\|| cat$"
        },
        "workingDirectory": {
            "type": "String",
            "default": "",
            "description": "(Optional) The path to the working directory on your instance.",
            "maxChars": 4096
        },
        "executionTimeout": {
            "type": "String",
            "default": "3600",
            "description": "(Optional) The time in seconds for a command to complete before it is considered
to have failed. Default is 3600 (1 hour). Maximum is 172800 (48 hours).",
            "allowedPattern": "([1-9][0-9]{0,4})|(1[0-6][0-9]{4})|(17[0-1][0-9]{3})|(172[0-7][0-9]{2}) :
(172800)"
        }
    },
    "mainSteps": [
        {
            "action": "aws:runShellScript",
            "name": "runSSHCommand",
            "inputs": {
                "runCommand": "{{ commands }}",
                "workingDirectory": "{{ workingDirectory }}",
                "timeoutSeconds": "{{ executionTimeout }}"
            }
        }
    ]
}
```

FIG. 10

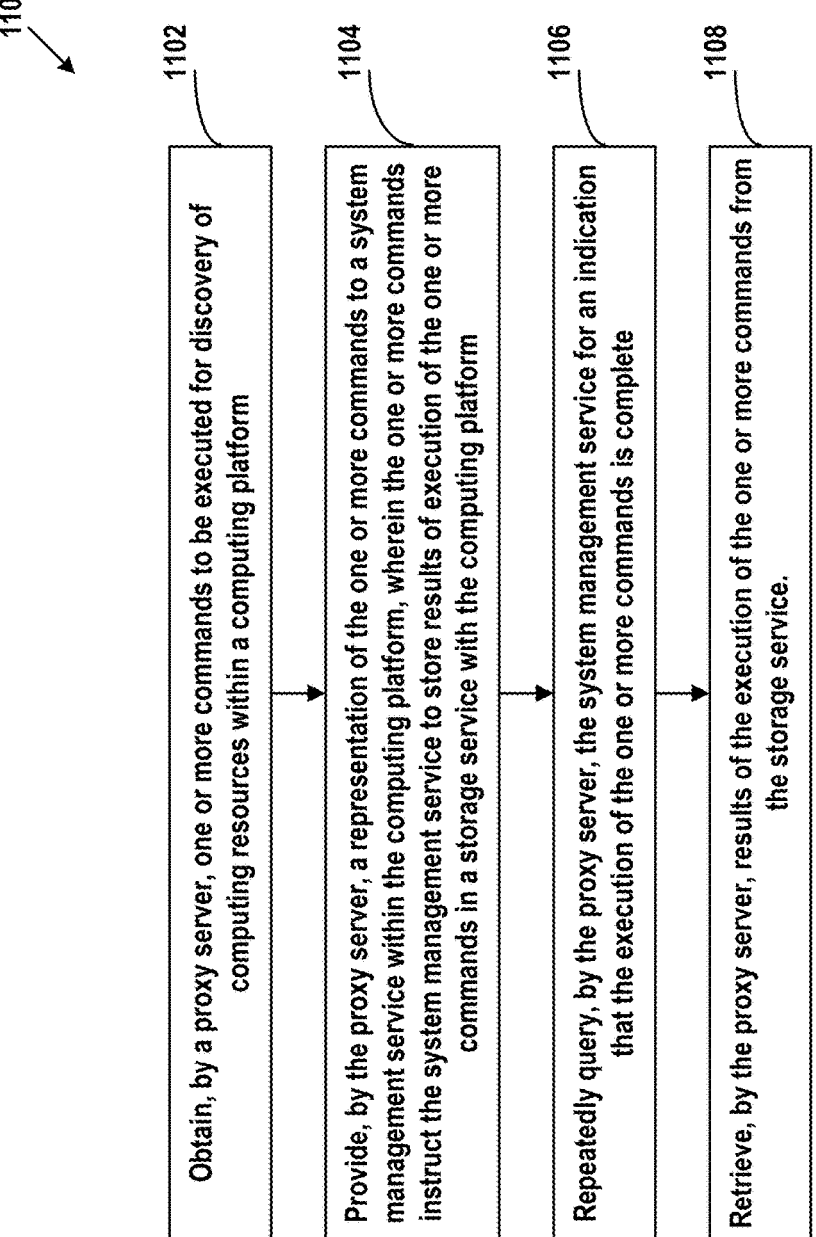

1100

1102 Obtain, by a proxy server, one or more commands to be executed for discovery of computing resources within a computing platform 1104 Provide, by the proxy server, a representation of the one or more commands to a system management service within the computing platform, wherein the one or more commands instruct the system management service to store results of execution of the one or more commands in a storage service with the computing platform 1106 Repeatedly query, by the proxy server, the system management service for an indication that the execution of the one or more commands is complete 1108 Retrieve, by the proxy server, results of the execution of the one or more commands from the storage service.

FIG. 11

DISCOVERY OF VIRTUAL COMPUTING INFRASTRUCTURE

BACKGROUND

As reliance on cloud-based services grows, it becomes commensurately more important to be able to accurately assess the types, quantities, and characteristics of the computing resources allocated or available to a cloud account. Cloud-based discovery involves procedures used to identify computer hardware and software resources (including virtualized resources) associated with a cloud account and the relationships between these resources. However, current cloud-based services are typically split into multiple regions and/or zones, requiring the setup, maintenance, and operation of distinct discovery software and procedures for each region and/or zone. As a result, discovery software (e.g., in the form of a proxy server) is replicated in each such region or zone, wasting processor and memory resources while making configuration more complex and error prone. Further, current discovery procedures identify cloud-based resources at a high level and do not support determining specific utilizations of hardware (e.g., memory and processing capabilities of specific server hardware).

SUMMARY

Cloud-based providers now can deploy system management services and agents within their computing infrastructure. The system management services allow communication with the agents, where the agents are associated with various cloud-based services regardless of region or zone. Consequently, these system management services and agents can be used for cloud-based discovery without having to deploy a proxy server to each region or zone. In some cases, proxy servers might not be required to be deployed within the computing infrastructure at all. Thus, when cloud-based discovery procedures are adapted to use system management services and agents, the computing resources required for multiple deployments of proxy servers within a cloud-based provider are reduced or eliminated. As a consequence, less processing, memory, network, and/or power capacity is required, while configuration is simplified and—in some cases—more detailed information about cloud-based services and their underlying computing infrastructure can be obtained during discovery.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions. A method includes obtaining, by a proxy server, one or more commands to be executed for discovery of computing resources within a computing platform. The method also includes providing, by the proxy server, a representation of the one or more commands to a system management service within the computing platform, where the one or more commands instruct the system management service to store results of execution of the one or more commands in a storage service with the computing platform. The method also includes repeatedly querying, by the proxy server, the system management service for an indication that the execution of the one or more commands is complete. The method also includes retrieving, by the proxy server, results of the execution of the one or more commands from the storage service. Other embodiments of this aspect include corresponding computer systems, apparatus, and computer programs recorded on one or more computer storage devices, each configured to perform the actions of the method.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 9 depicts securely storing and using credentials in a parameter store, in accordance with example embodiments.

FIG. 10 depicts a discovery command transformed into a document that is executable by a cloud-based service, in accordance with example embodiments.

FIG. 11 is a flow chart, in accordance with example embodiments.

DETAILED DESCRIPTION

Figure 1:
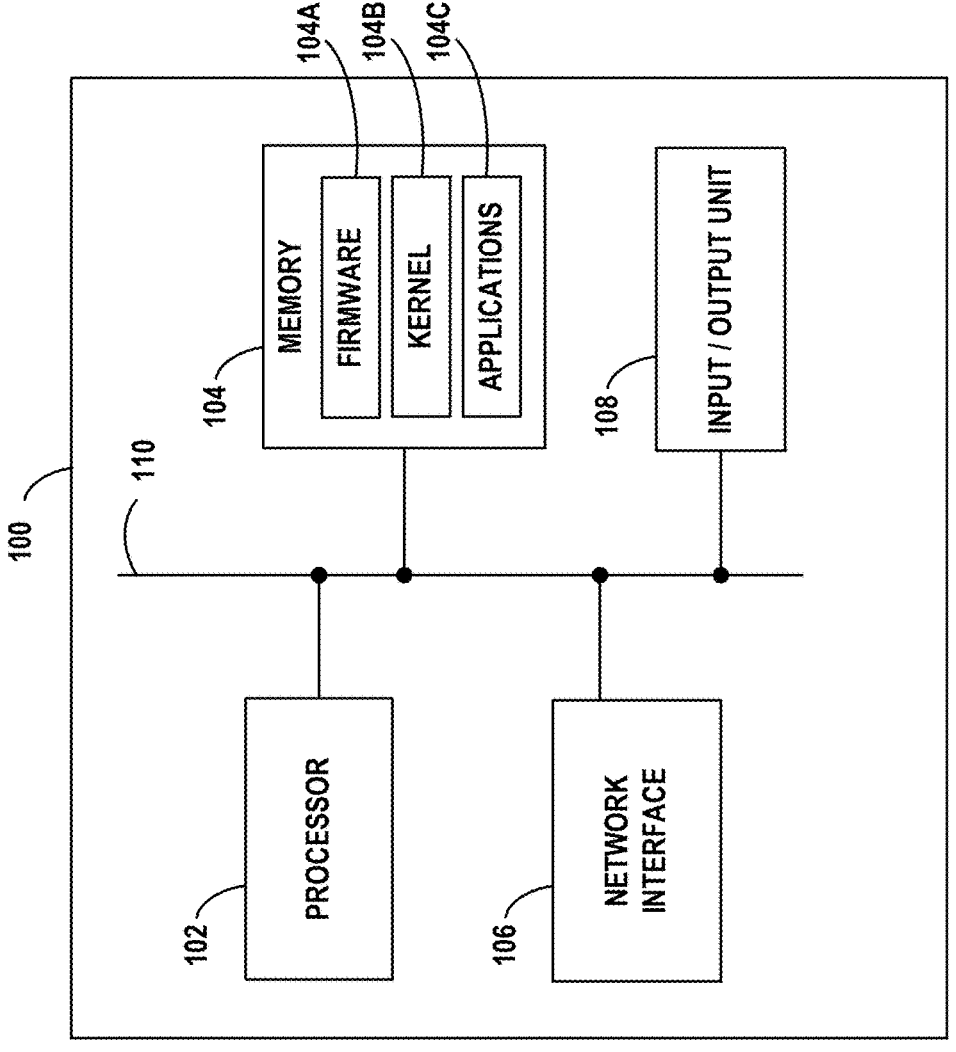
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of software features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Unless clearly indicated otherwise herein, the term "or" is to be interpreted as the inclusive disjunction. For example, the phrase "A, B, or C" is true if any one or more of the arguments A, B, C are true, and is only false if all of A, B, and C are false.

I. Example Technical Improvements

These embodiments provide a technical solution to a technical problem. One technical problem being solved is enabling cloud-based discovery without requiring a proxy server to be deployed into each region or zone of a cloud-based provider's network.

Currently, cloud-based providers can deploy data centers in multiple geographic regions, and thus divide their cloud-based services into regions or zones. A proxy server deployed into one of these zones is unable to communicate directly with the cloud-based services of other regions or zones. As a consequence, duplicate proxy servers are needed, one per region or zone. Furthermore, current cloud-based discovery techniques are drawn to discovering high-level cloud-based services, and often cannot discern the attributes (e.g., configuration and/or operational parameters) of the underlying computing infrastructure (e.g., physical hardware or supporting software) upon which these services rely.

The embodiments herein overcome these limitations by leveraging the existence of a system management service within the cloud-based network. The system management service is configured to be able to communicate with most if not all services and devices within any region or zone of the cloud-based provider's network. Thus, a single proxy server (or a smaller number of proxy servers than the number of regions or zones) may be able to send discovery commands to the system management service and receive discovery results therefrom. These results are more complete than those previously available, including attributes relating to the configuration details of the computing infrastructure associated with each cloud-based service of interest. In this manner, cloud-based discovery can be accomplished in a more accurate and robust fashion. This also results in reduced utilization of computing resources (e.g., processing, memory, network, and/or power capacity) due to fewer proxy servers needing to be deployed in the cloud-based provider's network.

Other technical improvements may also flow from these embodiments, and other technical problems may be solved. Thus, this statement of technical improvements is not limiting and instead constitutes examples of advantages that can be realized from the embodiments.

II. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM), IT service management (ITSM), IT operations management (ITOM), and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) has been introduced to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets and/or web components for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, tem-plating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist, including but not limited to metadata-based encodings of web components, and various uses of JAVASCRIPT® Object Notation (JSON) and/or extensible Markup Language (XML) to represent various aspects of a GUI.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe archi-tectural and functional aspects of example aPaaS systems, as well as the features and advantages thereof.

III. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a graphical processing unit (GPU), a digital signal processor (DSP), a network processor, an encryption processor, and/or a form of integrated circuit or controller that performs processor operations. In some cases, processor 102 may be one or more single-core processors. In other cases, processor 102 may be one or more multi-core processors with multiple independent processing units. Proces-sor 102 may also include register memory for temporarily storing instructions being executed and related data, as well as cache memory for temporarily storing recently used instructions and data.

GPUs, in particular, have grown in importance. They include specialized circuitry designed to perform rapid mathematical calculations for rendering graphics, process-ing large datasets, and supporting machine learning. A GPU typically consists of hundreds or thousands of small cores that operate simultaneously, facilitating the decomposition of tasks into smaller, more manageable pieces that are processed in parallel. This parallelism allows GPUs to be significantly faster than traditional CPUs for certain types of calculations.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Herein, any non-volatile memory may be referred to as persistent storage.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, 10 Gigabit Ethernet, Ethernet over fiber, and so on). Network interface 106 may also support communication over one or more non-Ethernet media, such as coaxial cables or power lines, or over wide-area media, such as Synchronous Optical Networking (SONET), Synchronous Digital Hierarchy (SDH), Data Over Cable Service Interface Specification (DOCSIS), or other technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed. The exact physical location, connectivity, and configuration of these computing devices may be unknown and/or unimportant to client devices. Accordingly, the computing devices may be referred to as "cloud-based" devices that may be housed at various remote data center locations.

Figure 2:
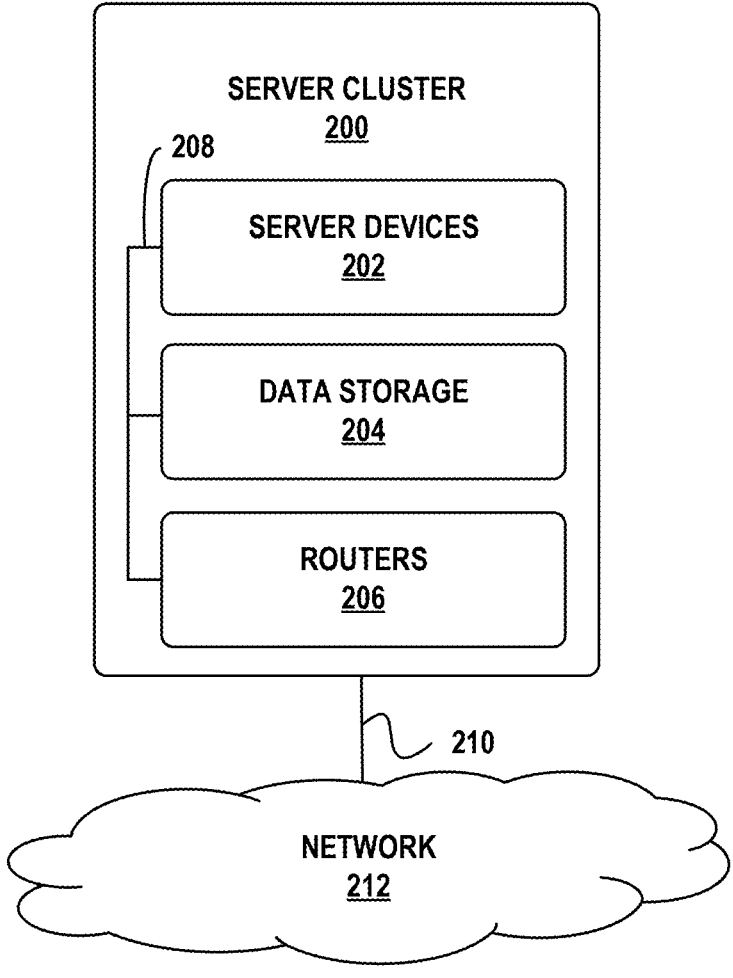
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database or a No-SQL database (e.g., MongoDB). Various types of data structures may store the information in such a database, including but not limited to files, tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, XML, JSON, or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

IV. Example Remote Network Management Architecture

Figure 3:
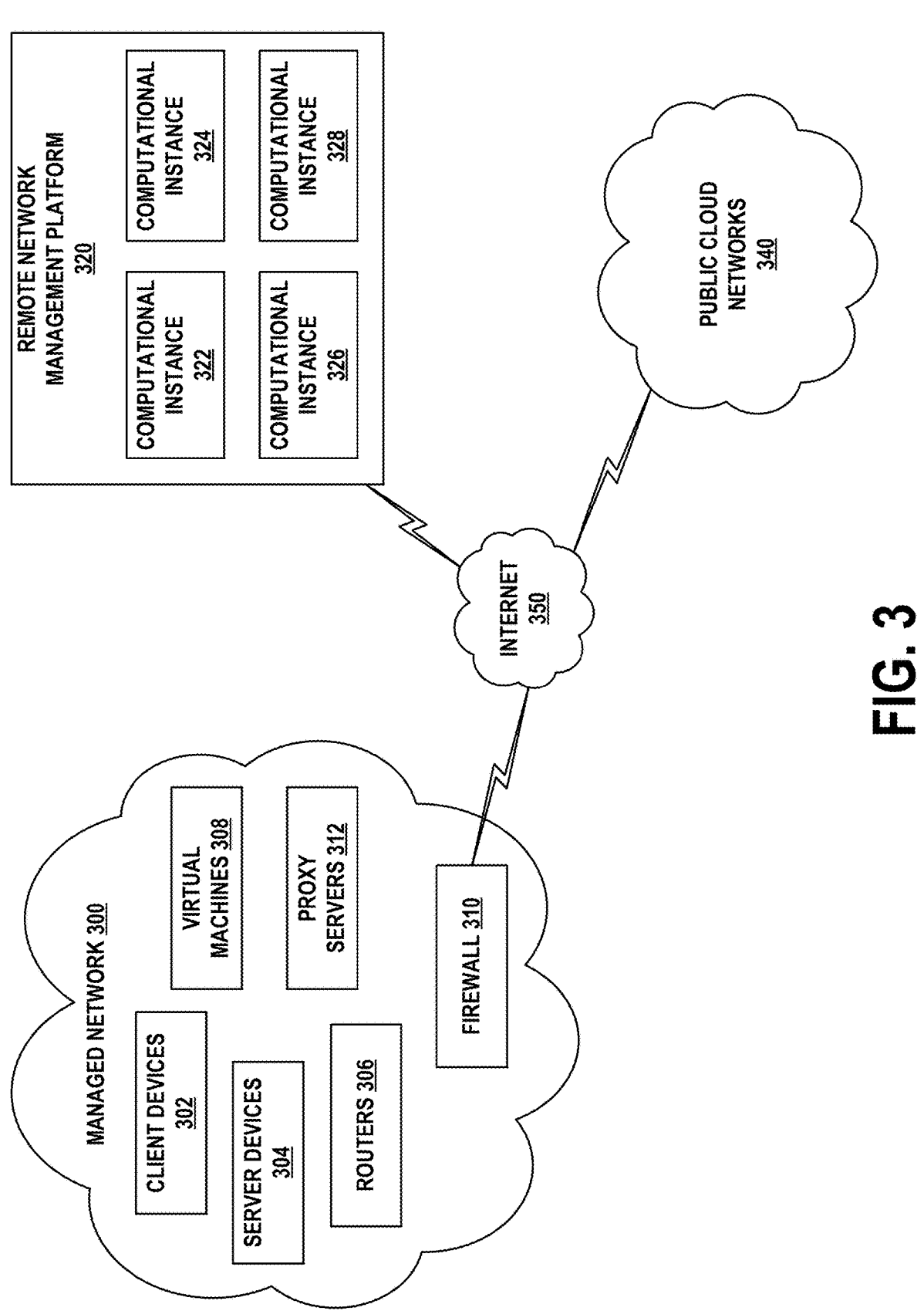
FIG. 3 depicts a remote network management architecture, in accordance with example embodiments.

FIG. 3 depicts a remote network management architecture, in accordance with example embodiments. This architecture includes three main components managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
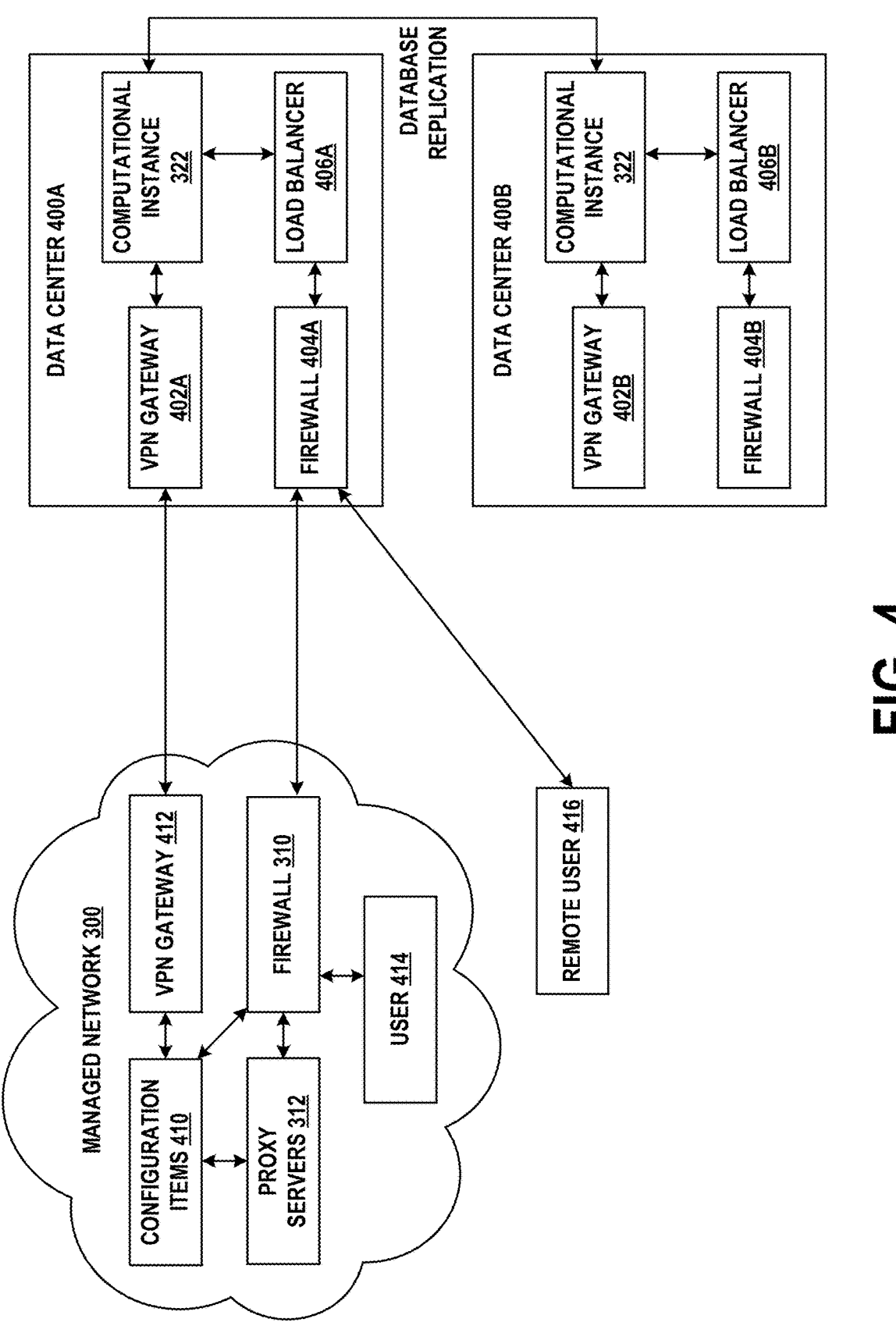
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

V. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of these devices, components, applications, and services may be referred to as configuration items.

The process of determining the configuration items and relationships therebetween within managed network 300 is referred to as discovery, and may be facilitated at least in part by proxy servers 312. To that point, proxy servers 312 may relay discovery requests and responses between managed network 300 and remote network management platform 320.

Configuration items and relationships may be stored in a CMDB and/or other locations. Further, configuration items may be of various classes that define their constituent attributes and that exhibit an inheritance structure not unlike object-oriented software modules. For instance, a configuration item class of "server" may inherit all attributes from a configuration item class of "hardware" and also include further server-specific attributes. Likewise, a configuration item class of "LINUX® server" may inherit all attributes from the configuration item class of "server" and also include further LINUX®-specific attributes. Additionally, configuration items may represent other components, such as services, data center infrastructure, software licenses, units of source code, configuration files, and documents.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
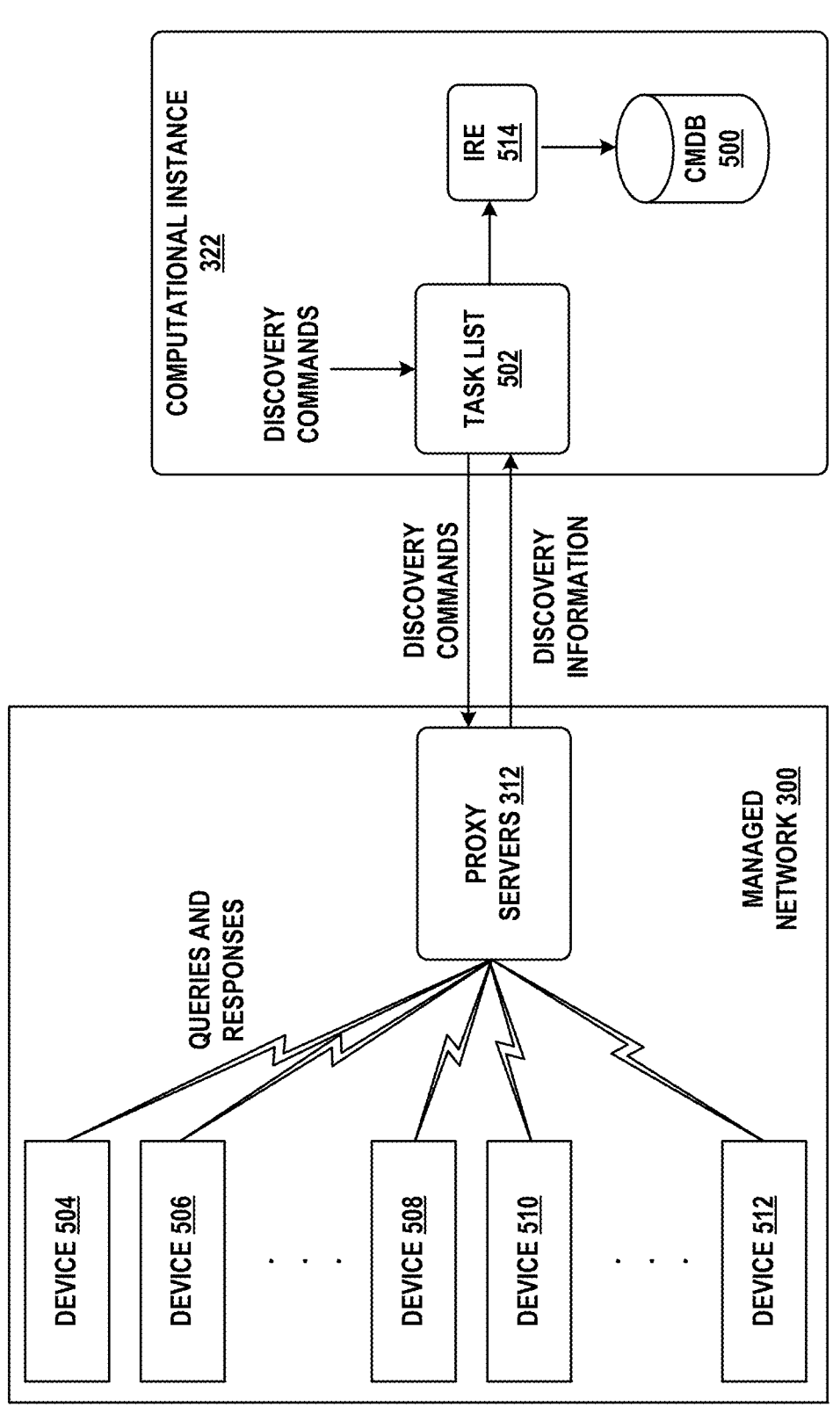
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

VI. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on.

If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VII. Example Cloud-Based Service

The embodiments herein provide improved techniques and systems for efficiently discovering cloud-based resources as configuration items. For example, managed network 300 may have multiple cloud accounts affording access to one or more public cloud networks 340. As noted above, examples of public cloud networks 340 include AWS, Azure, GCP, and others. While the embodiments herein may be operable with a number of public cloud networks 340, AWS will be used herein as an illustrative example.

Managed network 300 may, for example, employ several cloud accounts for AWS so that different individuals, groups, or entities can utilize and manage resources (e.g., virtual machines, databases, storage, and networking) within the AWS cloud. For example, AWS may provide web-based graphical user interfaces and programmatic APIs so that the administrator of a cloud account can launch, monitor, and modify these resources.

AWS is a globally distributed cloud-based platform designed to provide computing infrastructure and resources for a wide range of software applications and services. Here, computing infrastructure includes hardware components like physical servers, storage systems, and networking equipment, combined with software components and features such as virtualization, containerization, and orchestra-tion tools that enable efficient deployment and scaling of applications. Architecturally, AWS operates within geographically distinct regions, each of which may contain one or more availability zones (zones). A zone is typically implemented within a discrete data center with power, cooling, and networking capabilities that are independent from other zones or regions. Zones may be interconnected via network lines, enabling high availability and redundancy. As of the time of this writing, AWS includes 34 regions with 108 zones.

AWS provides a suite of services to support compute, storage, networking, and other uses. Some examples are Lambda, Elastic Compute Cloud (EC2), Simple Storage Service (S3), Relational Database Service (RDS), and Virtual Private Cloud (VPC). Nonetheless, other cloud services and types thereof may exist.

Lambda is a serverless computing service that allows applications to execute without explicit management of physical or virtual servers. Thus, Lambda provides for the execution, scaling, and maintenance of underlying infrastructure in an on-demand fashion. Further, Lambda is largely event-driven, meaning it can operate applications in response to specific triggers like file uploads, changes in a database, or various API calls.

EC2 provides resizable virtual servers, known as instances (not to be confused with computational instances of remote network management platform 320), for running applications in AWS. It supports various instance types, operating systems, and configurations to accommodate workloads ranging from web hosting to high-performance computing. EC2 allows scaling up or down based on demand, as well as integration with storage systems.

S3 provides an object storage service that facilitates storage and retrieval of large or small amounts of data, from file backups to large-scale training datasets for machine learning. S3 organizes data into buckets and provides features like versioning, lifecycle policies, and fine-grained access control. S3 is frequently used for storing static website content, media files, and archival data.

RDS provides for the configuration, operation, and scaling of relational databases in AWS. It supports multiple database applications, including MySQL and PostgreSQL. RDS provides high availability through deployments that are redundant across zones.

VPC provides for the creation and management of secure networks within AWS so that cloud resources can be isolated from other resources. It provides control over network configurations, including IP address ranges, subnets, routing tables, and security groups. This allows hosting of applications in private subnets with no external Internet access or in public subnets for web-facing resources.

Current efforts to provide cloud-based discovery within AWS are limited by the use of regions and zones. Each region is largely isolated from other regions and each zone within a region is largely isolated from other zones within that region and from zones within other regions. Since cloud discovery presently relies on placing a proxy server 312 within each region or within each zone, deploying cloud discovery for some managed networks requires setting up and maintaining a dozen or more copies of proxy server 312 in AWS. But doing so results in duplication of effort and increased overhead, leading to leading to greater use of compute, memory, networking, and energy resources. Moreover, current cloud-based discovery is unable to determine the specific capacities of the computer hardware (e.g., memory and processor capacities) on which the cloud-based usage of managed network 300 relies. Thus, it would be technically advantageous to improve cloud-based discovery so that these drawbacks are mitigated.

Figure 6:
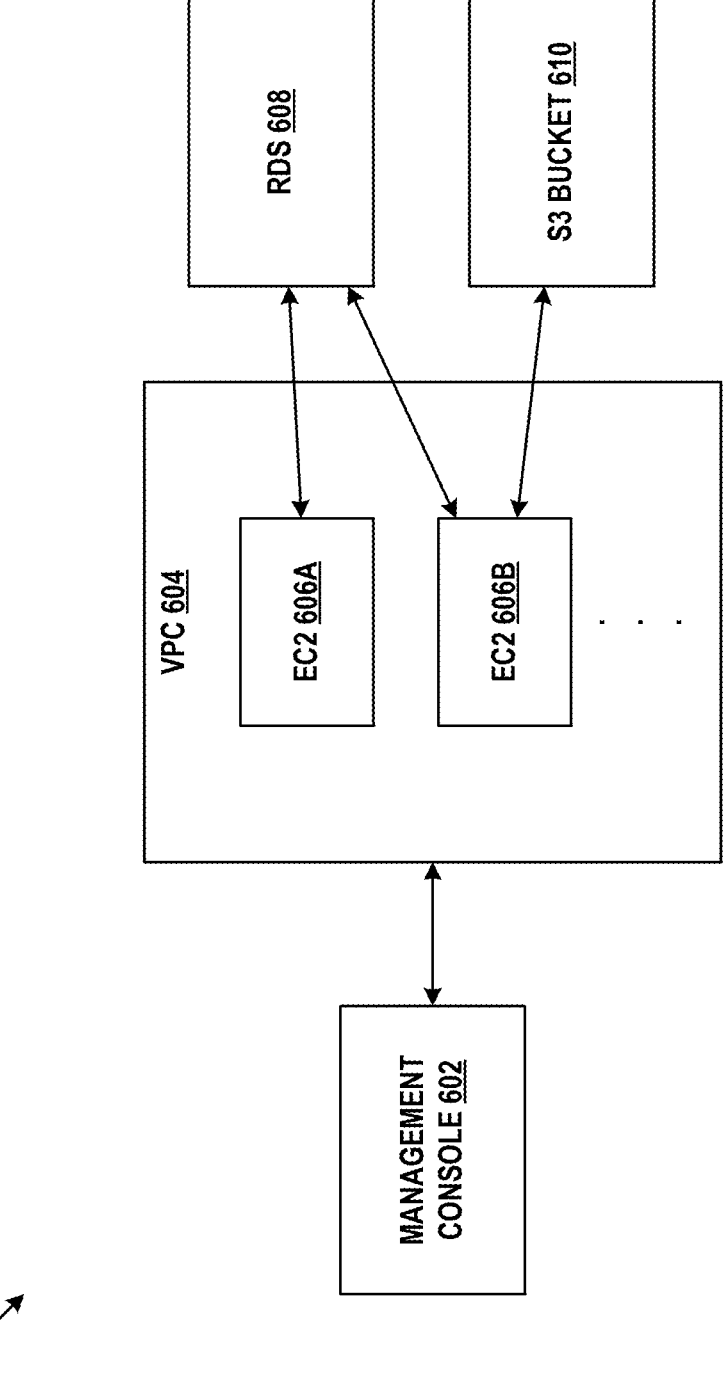
FIG. 6 depicts an arrangement of components within a cloud-based service, in accordance with example embodiments.

FIG. 6 depicts an example architecture 600 that provides a possible arrangement of services in AWS. Notably, other arrangements and/or services may be possible.

Management console 602 represents a web-based or app-based interface that acts as a central hub for interacting with AWS, particularly for managing and monitoring various AWS services. Management console 602 may include, for example, one or more dashboards where users can control and monitor resource allocation, resource usage, configure security settings, and interact with services such as EC2, S3, RDS, VPC, and others. Use of management console 602 may simplify complex tasks by providing graphical tools, wizards, and pre-configured templates, making it accessible even to non-technical users.

VPC 604 represents a secure network within AWS that contains resizable virtual computing infrastructure EC2 606A and EC2 606B. As indicated by the ellipsis, more or fewer EC2 instances may be present within VPC 604.

RDS 608 and S3 bucket 610 represent database and file storage, respectively. As shown, both EC2 606A and EC2 606B are configured to communicate with RDS 608, while only EC2 606B is configured to communicate with S3 bucket 610. RDS 608 and S3 bucket 610 are configured to be outside of VPC 604, but RDS 608 and S3 bucket 610 can communicate with services within VPC 604.

While FIG. 6 depicts management console 602 communicating via VPC 604, management console 602 may communicate directly with EC2 606A, EC2 606B, RDS 608 and/or S3 bucket 610. Other possible arrangements may include multiple VPC instances, each accessible by management console 602, for example.

One of the disadvantages of current cloud discovery procedures is that cloud discovery must be configured separately for each region and/or zone. This means that a proxy server is placed within each region and zone and is specifically configured with the network addresses (e.g., IP addresses) of components within those regions so that discovery procedures can employ SSH, WMI, or other mechanisms to probe those components. For example, the proxy server within a region may be configured with network addresses of dozens of Linux physical or virtual server so that it can remotely query those devices via SSH for their hardware and software information to be stored as configuration items in a CDMB (e.g., CMDB 500).

Thus, these current cloud discovery procedures require a significant amount of configuration that does not scale across multi-region and/or multi-zone deployments. For example, the proper credentials for each resource to be discovered (e.g., userid and password pairs) may need to be configured so that proxy servers can access these resources. Further, placing multiple proxy servers within each region and/or zone in which cloud discovery is to take place wastes computing resources (e.g., processing, memory, network, and power capacity in order to operate each proxy server).

VIII. Improved Cloud-Based Discovery

Figure 7:
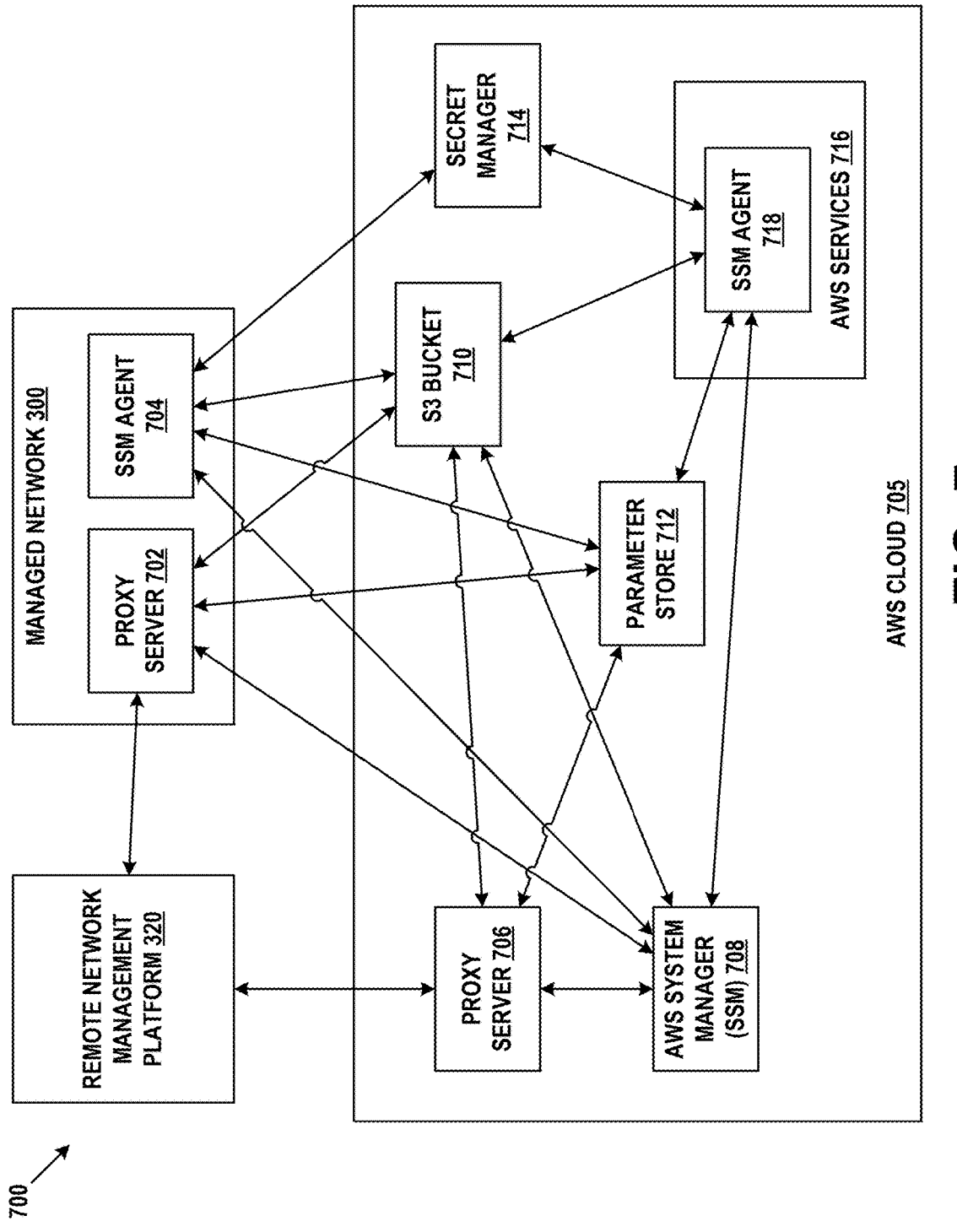
FIG. 7 depicts an architecture for improved cloud-based discovery, in accordance with example embodiments.

FIG. 7 depicts an architecture 700 that facilitates improved cloud-based discovery. Notably, FIG. 7 is presented for purposes of example and is not intended to limit the scope of the present disclosure. Other arrangements are possible involving more or fewer steps and/or components configured in a variety of different manners. For example, aspects of FIG. 7 may be implemented in hardware, software, firmware, or any combination thereof. Furthermore, these aspects may be implemented in a distributed computing environment where various components are located in different physical locations and communicate with each other via one or more networks.

In FIG. 7, remote network management platform 320 can communicate with either or both of managed network 300 and AWS cloud 705 for purposes of cloud-based discovery. In the case of managed network 300, remote network management platform 320 may communicate with proxy server 702 (here, proxy server 702 is assumed to have the same or similar functionality as proxy server 312). In the case of AWS cloud 705, remote network management platform 320 may communicate with proxy server 706 (here, proxy server 706 is assumed to have the same or similar functionality as proxy server 312 modified as needed to perform the operations described below).

AWS cloud 705 represents at least part of a public cloud network, such as one or more regions and/or zones of AWS. As shown, AWS cloud 705 includes proxy server 706, AWS system manager (SSM) 708, S3 bucket 710, parameter store 712, and secret manager 714. AWS cloud 705 also include AWS resources 716, which represents one or more units, instances and/or copies of cloud-based computing services such as EC2, S3, RDS, and/or VPC. These instances may span multiple regions and/or zones. SSM 708 may also be referred to as a system management service or a system management node.

One or more of SSM agent 704 are disposed within managed network 300 and used to facilitate optional agent-based discovery of computing resources within managed network 300. One or more of SSM agent 718 are disposed within AWS services 716 and used to facilitate agent-based discovery in AWS cloud 705. For example, SSM agent 704 and SSM agent 718 may process requests from SSM 708 to update, manage, and configure computing resources. SSM agent 704 and SSM agent 718 may send the results of these requests back to SSM 708 using a messaging service (either Amazon Message Gateway Service or the Amazon Message Delivery Service, depending on AWS region version). SSM agent 704 and SSM agent 718 may have additional functionality which will be described below.

SSM 708 may serve as an operations hub for managing and controlling applications and resources in AWS cloud 705, as well as in hybrid and multi-cloud environments. Some capabilities of SSM 708 include application management, change management, node management, and operations management. SSM 708 can be accessed via a management console (such as management console 602), by way of remote API call, and/or by way of a command line interface.

When used with proxy server 702 or proxy server 706, SSM 708 can enable discovery of AWS services 716 without requiring deployment of a proxy server to each region or zone. In other words, one SSM 708 can communicate with any of AWS services 716-regardless of the region or zone in which they are located-possibly by way of an SSM agent 718 deployed on or in conjunction with each of AWS services 716. Thus, using proxy server 702 or proxy server 706 to undertake cloud discovery procedures by way of a single SSM 708 reduces wastage of computing resources (e.g., processing, memory, network, and power capacity in order to operate each proxy server). Additionally, since there are pre-existing trust relationships between SSM 708 and each SSM agent 718, credentials do not need to be configured for each SSM agent 718. Furthermore, this arrangement of discovery procedures employing SSM 708 can also be used to discover computing resources in management network 300 by way of copies of SSM agent 704 deployed on or in conjunction with these resources.

S3 bucket 710 is an instance of S3 storage. However, as described below, it is used for purposes of storing files and discovery results used by cloud-based discovery. Thus, S3 bucket 710 might not be used directly by any of AWS services 716.

Parameter store 712 may facilitate the storage of specific data. For example, it can be used to store values in the form of a single unencrypted character string, a list of unencrypted character strings, and/or a single encrypted character string value. Here, the character strings may be ASCII, Unicode, or bytecode strings.

Secret manager 714 may facilitate the storage of more complex types of data, such as credentials (e.g., userid and password pairs) to certain databases/applications within AWS services 716, as well as API keys and/or further types of tokens (e.g., one-time passwords, public key infrastructure certificates, etc.).

A high level example of a cloud-based discovery procedure that can be facilitate by architecture 700 follows. A more detailed description of a cloud-based discovery procedure is presented further below.

Remote network management platform 320 (more specifically, a computational instance within this platform) provides one or more commands to a proxy server (either proxy server 702 or proxy server 706) for execution on AWS cloud 705. The commands may relate to cloud-based discovery of computing resources within AWS cloud 705 that are associated with one or more cloud accounts.

The proxy server optionally makes API calls to components within AWS cloud 705. These API calls may store a representation of the one or more commands in S3 bucket 710 and/or create temporary credentials in parameter store 712 for executing at least some of the one or more commands.

The proxy server calls an API on SSM 708 to execute a specified set of commands (also known as a document). This call be made asynchronously, in that the proxy server need not wait for completion of the commands before the call returns and the proxy server can carry out other operations. The document can include text files, images, videos, PDFs, JSON configurations, and/or datasets that are stored in an S3 bucket and identified by a unique S3 key (e.g., a file name) within the S3 bucket. The document may include an interpretable script that is executed by the computing infrastructure of the cloud-based platform.

SSM 708 provides the specified set of commands to SSM agents associated with one or more target devices or services. SSM agents on managed network 300 (e.g., SSM agent 704) may be executable on specific target devices. SSM agents on AWS services 716 (e.g., SSM agent 718) may be executable in conjunction with specific instances of AWS services 718. During this execution, some commands may require API calls to S3 bucket 710, parameter store 712, and/or secret manager 714.

Once the commands are finished executing, the corresponding SSM agent may respond back to SSM 708 with the results from executing the commands. Alternatively or additionally, the result can be stored in a specific locations within S3 bucket 710. In this case, the SSM agent will provide a reference to that location to SSM 708, and SSM 708 may then retrieve the results.

While SSM 708 and/or other components of AWS cloud 705 are executing the commands, the calling proxy server may poll (e.g., repeatedly query) SSM 708 for completion of the execution. When the execution is complete and SSM 708 indicates as such, the calling proxy server may retrieve the overall cloud-based discovery results from S3 bucket 710 and provide these results to remote network management platform 320.

Figure 8A:
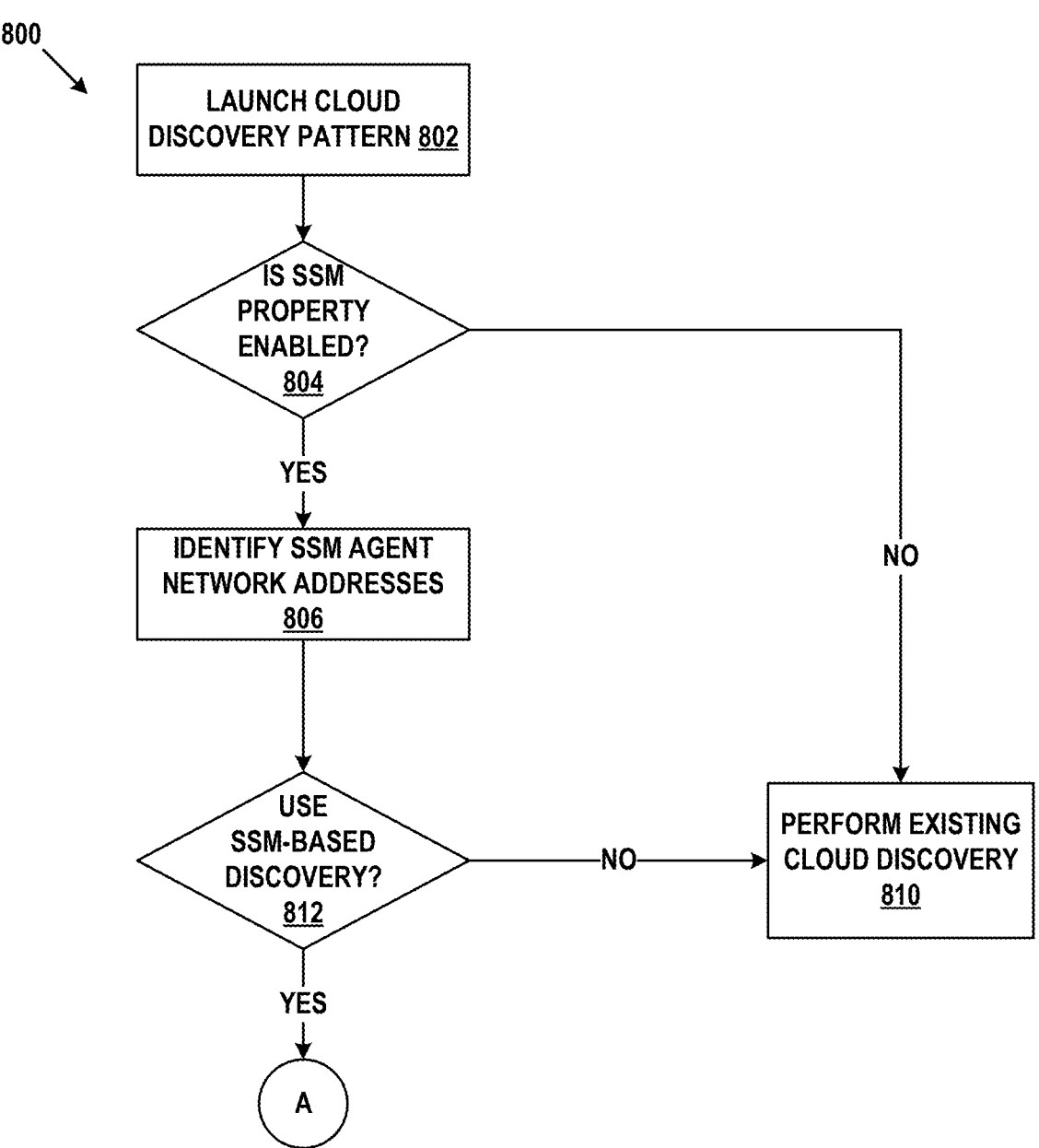
FIGS. 8A and 8B depict a procedure for improved cloud-based discovery, in accordance with example embodiments.
Figure 8B:
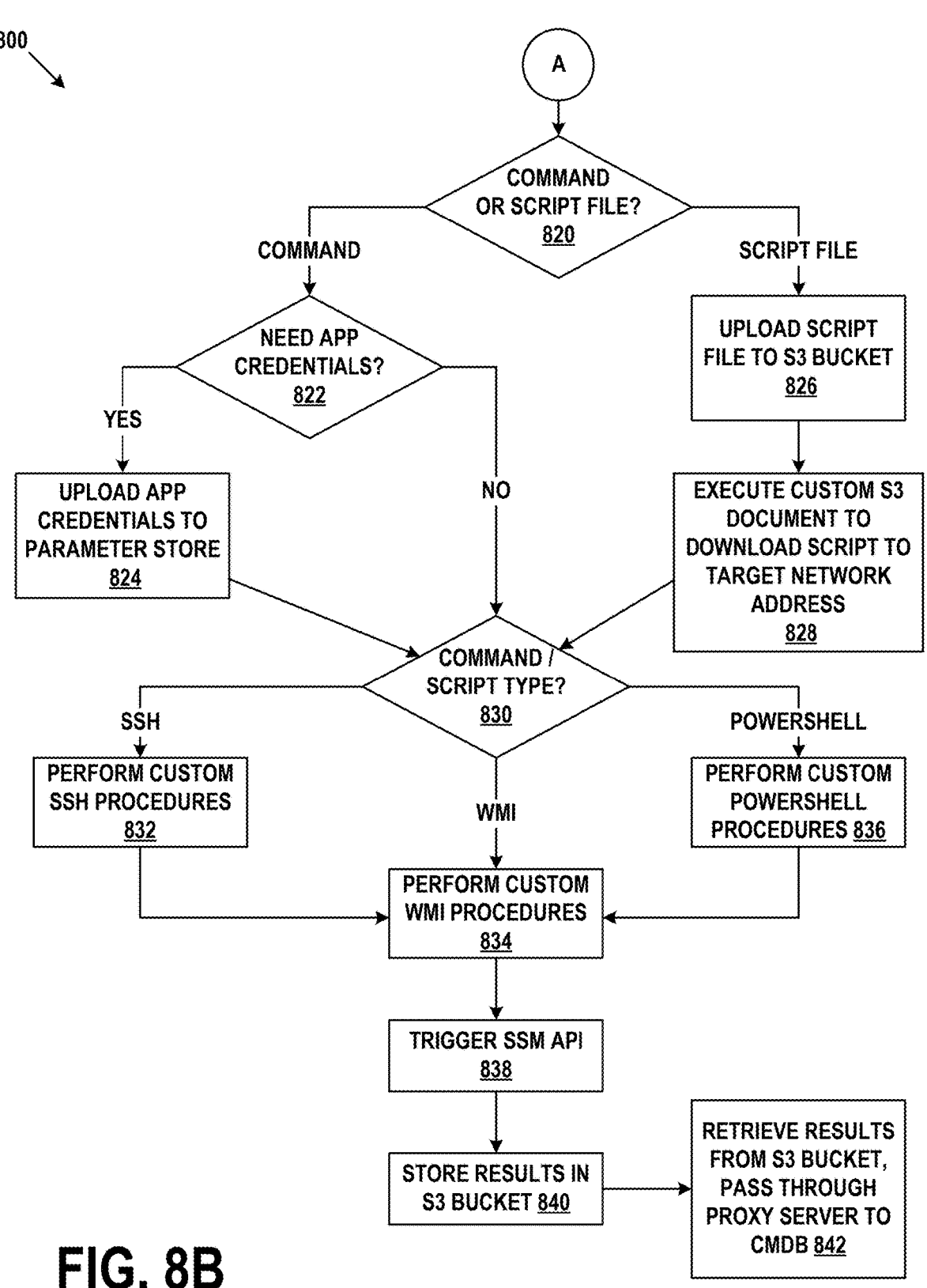

FIGS. 8A and 8B depict a procedure 800 for improved cloud-based discovery. Notably, these figures are presented for purposes of example and is not intended to limit the scope of the present disclosure. Other arrangements are possible involving more or fewer steps and/or components configured in a variety of different manners. For example, the steps of these figures may be implemented in hardware, software, firmware, or any combination thereof. Furthermore, these steps may be implemented in a distributed computing environment where various components are located in different physical locations and communicate with each other via one or more networks.

At step 802, a cloud discovery pattern is launched. As noted above, such a pattern may specify a series of operations that define how to discover a particular arrangement of devices, components, and/or applications, what credentials to use, and which CMDB tables to populate with configuration items resulting from this discovery. In this case, the pattern is used to obtain general information relating to one or more AWS accounts, such as the account names, data centers they can use, regions and/or zones in which these data centers are arranged, as well as a list of AWS services associated with these accounts (e.g., AWS services such as EC2, S3, RDS, VPC, and others) and their corresponding SSM agents where applicable. This pass of cloud discovery provides a high-level view of the resources but typically lacks specific hardware and software configuration details of the computing infrastructure used by the AWS services. The network addresses of these resources may be identified by this process.

At step 804, it is determined whether the SSM property is enabled for the pattern. If not, control passes to step 810 where existing cloud discovery procedures are performed for all resources to be discovered (i.e., the improved cloud discovery procedures cannot be performed).

Step 810 may involve the scanning, classification, identification, and exploration being performed on all network addresses, similar to the phases of discovery described above. Notably, scanning may involve identifying open TCP and/or UDP ports on the network addresses, classification may involve probing each network address to determine its type of operating system, identification may involve launching operating-system-specific probes on each network address to determine its general configuration information (e.g., serial numbers and network interfaces), and exploration may involve probing each network address for additional configuration details.

If the SSM property is enabled for the pattern, control passes to optional step 806. At step 806, SSM agent network addresses may be identified within the pattern. This may involve the pattern being configured so that these addresses are clearly discernable in the pattern (e.g., marked in some fashion) to differentiate them from non-SSM network addresses associated with resources other than SSM agents. Alternatively, the pattern being performed can include a step that queries AWS (e.g., SSM 708) to obtain an up to date list of SSM agents. Notably, just because an AWS resource is associated with an SSM agent that does not mean that the SSM agent can be used for improved cloud-based discovery. Certain policies within AWS may need to be in place for such procedures to occur. Thus, sometimes existing cloud discovery procedures will be performed on AWS resources associated with SSM agents.

Additionally, SSM agents within managed network 300 (e.g., SSM agent 704) may not be known to SSM 708 and therefore their network addresses (e.g., IP addresses) should be provided during this step. Also, the network addresses of SSM agent 704 should be accessible remotely by AWS cloud 705 (e.g., any firewall on managed network 300 should be configured to allow access to these network addresses from at least some components of AWS cloud 705).

At step 812, it is determined whether SSM-based discovery can be used for each network address. If the network address is of a non-SSM entity, control passes to step 810 and where existing cloud discovery procedures are performed this network address (i.e., the improved cloud discovery procedures cannot be performed). If SSM-based discovery can be used (e.g., the network address has an associated SSM agent and the credentials for this SSM agent are available to SSM 708), then control passes to block A.

Turning to FIG. 8B, block A passes control to step 820, in which a determination is made as to whether a command or a script file is being used for cloud discovery. A command may be a single UNIX or PowerShell command. Here, a UNIX command may be a single command line that is operable within a command shell, while a PowerShell command may be single command line that is operable within a PowerShell session. For example, the UNIX "uname -a" command executed on a computing device with a UNIX operating system may provide a text string with content that indicates the operating system type, the computing device's hostname, its kernel version, the processor type, and so on. On the other hand, a script may be a series of commands that are performed in a specific order or fashion to undertake discovery. For example, a script for discovering a web server application executing on a computing device might (i) identify an executing web service, (ii) collect details about the service from its configuration files, (iii) parse logs to determine additional attributes of the web service, and (iv) generate one or more configuration items from this information for storing in a CMDB. Other possibilities exist.

If a command is being used, control passes to step 822. If a script is being used, control passes to step 826.

At step 822, it is determined whether application credentials are needed to carry out the command. For example, if the command is to control a database application, a userid and password with the appropriate permissions may be needed to access the database application. If application credentials are needed, they can be uploaded to parameter store 712 at step 824. Typically, these application credentials can be retrieved from a CMDB. As noted previously, the application credentials can be securely stored in an encrypted or obfuscated fashion in parameter store 712.

At step 826, the script file is uploaded to S3 bucket 710. These scripts may be stored in the CMDB and retrieved by a proxy server on demand for uploading to S3 bucket 710. At step 828, a custom S3 document is triggered to download the script file to one or more computing devices with specific target network addresses.

At step 830, the type of the command or script is determined. For example, the types might include SSH, WMI, or PowerShell. In each case a similar procedure is followed.

If the type is SSH, control passes to step 832. In this step, an SSH document representing an outline of SSH discovery procedures is retrieved from a documents table of the CMDB, the command or script is added to the SSH document along with a reference to any required application credentials in parameter store 712, and an SSH executor is launched on the one or more computing devices with specific target network addresses.

If the type is WMI, control passes to step 834. In this step, a WMI document representing an outline of WMI discovery procedures is retrieved from a documents table of the CMDB, the command or script is added to the WMI document along with a reference to any required application credentials in parameter store 712, and a WMI executor is launched on the one or more computing devices with specific target network addresses.

If the type is PowerShell, control passes to step 836. In this step, a PowerShell document representing an outline of PowerShell discovery procedures is retrieved from a documents table of the CMDB, the command or script is added to the PowerShell document along with a reference to any required application credentials in parameter store 712, and a PowerShell executor is launched on the one or more computing devices with specific target network addresses.

Each of these different types of executors can be invoked using AWS APIs. For example, such an API may facilitate execution of a document by specifying the document, the AWS service on which the document is to execute, S3 bucket 710 and unique S3 key in which to store the results of the execution, etc.

At step 838, the SSM API on the AWS computing infrastructure associated with specific target network addresses is triggered. This causes execution of the SSH, WMI, or PowerShell executor. In this fashion, discovery information is obtained from the one or more computing devices. This execution is asynchronous and thus any results from execution of a command or script is stored in the specified location in S3 bucket 710.

An example of such an execution is shown in FIG. 9. It is assumed that application credentials for a MySQL database in AWS are stored in parameter store 712 (e.g., the application credentials have been read from a CDMB table within remote network management platform 320 and are for a username "alice"). At block 900, a first command retrieves these application credentials into the string $secure. At block 902, a second command invokes the MySQL database for username "alice" with the application credentials. Notably, the string $$password$$ is replaced by the application credentials in the string $secure. In this manner, a plaintext representation of the application credentials does not appear in any commands or logs of those commands, thereby increasing security.

At step 840, SSM 708 stores the results of discovery a results document in S3 bucket 710. The unique S3 key of this results document may be provided to the proxy server by SSM 708. One of the reasons for storing the results of discovery in S3 bucket 710 is to overcome any limits on the size of results that can be provided directly to SSM 708 (e.g., 24K characters in many current configurations).

At step 842, the proxy server may retrieve the results document from S3 bucket 710 and provide the discovery results to a CDMB. In some cases, the proxy server may poll (e.g., repeatedly query) an API on SSM 708 that indicates when whether the results are completed. When this is the case, SSM 708 may specify a location (e.g., the unique S3 key) of the results within S3 bucket 710. The proxy server may then retrieve the results document from this location in S3 bucket 710, transform these results into configuration items, and provide them to a CDMB for storage.

For purposes of illustration, FIG. 10 depicts an example document 1000 for executing an SSH command. This document is in JSON format but other formats could be used. The document includes three blocks that establish runtime parameters and one block that can be used to execute a command or script. Block 1002 sets forth parameters of the document including the command or script to execute (here, it is a command "uname-a"). Block 1004 sets forth the working directory for the execution of the command or script. Block 1006 sets forth an execution timeout for the command or script (e.g., how long the command or script will be allowed to run before it is considered to have failed). Block 1008 invokes the execution of the command with the parameters from blocks 1002, 1004, and 1006. Any command or script can be inserted into such a document so that the command or script can be executed by computing infrastructure that hosts an AWS service. Additionally, similar documents can be used for execution of WMI and/or PowerShell commands and scripts.

IX. Example Operations

FIG. 11 is a flow chart 1100 illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1102 may involve obtaining, by a proxy server, one or more commands to be executed for discovery of computing resources within a computing platform. The computing platform may have multiple regions and/or zones that may be correlated location-wise with physical data centers. The proxy server may not be able to communicate directly with all computing resources in each region or zone.

Block 1104 may involve providing, by the proxy server, a representation of the one or more commands to a system management service within the computing platform, wherein the one or more commands instruct the system management service to store results of execution of the one or more commands in a storage service with the computing platform.

Block 1106 may involve repeatedly querying, by the proxy server, the system management service for an indication that the execution of the one or more commands is complete.

Block 1108 may involve retrieving, by the proxy server, results of the execution of the one or more commands from the storage service.

Use of the system management service to perform discovery of computing resources in this fashion provides a technical benefit. The system management service is configured to be able to communicate with most if not all services and devices within any region or zone of the cloud-based provider's network. Thus, a single proxy server (or a smaller number of proxy servers than the number of regions or zones) may be able to send discovery commands to the system management service and receive discovery results therefrom. These results are more complete than those previously available, including attributes relating to the configuration details of the computing infrastructure associated with each cloud-based service of interest. In this manner, cloud-based discovery can be accomplished in a more accurate and robust fashion. This also results in reduced utilization of computing resources (e.g., processing, memory, network, and/or power capacity) due to fewer proxy servers needing to be deployed in the cloud-based provider's network.

In some embodiments, the one or more commands are obtained from a database located within a managed network, wherein the computing resources are located outside of the managed network but associated with the managed network.

Some embodiments may further involve writing, to the database, configuration items representing at least some of the results.

In some embodiments, the computing platform is a cloud-based system that provides the computing resources for use by an entity associated with the proxy server.

In some embodiments, the proxy server is located within the computing platform.

In some embodiments, the proxy server is located in a managed network, wherein the computing resources are associated with the managed network.

In some embodiments, providing the representation of the one or more commands to the system management service is in response to determining that: the proxy server is configured to use the system management service for discovery, and the commands are associated with network addresses of agents operating in conjunction with the computing resources. In some cases, the commands are associated with network addresses of agents operating within a managed network (e.g., outside of the computing platform) and in conjunction with additional computing resources of the managed network. In both situations, the system management service may perform discovery of the computing resources by way of the agents with these network addresses.

In some embodiments, the one or more commands includes a particular command that requires credentials of an application associated with the computing resources, wherein providing the representation of the one or more commands to the system management service comprises: obtaining the credentials; uploading the credentials to a parameter store located within the computing platform; and informing the system management service of a location of the credentials within the parameter store.

In some embodiments, the one or more commands are in a form of a script, wherein providing the representation of the one or more commands to the system management service comprises: uploading the script to the storage service; and informing the system management service of a location of the script within the storage service.

In some embodiments, the indication that the execution of the one or more commands is complete includes a location of the results in the storage service, wherein the proxy server retrieves the results of the execution from the location.

In some embodiments, the results include operational data or configuration data of the computing resources.

In some embodiments, repeatedly querying the system management service for the indication occurs asynchronously and in parallel to the system management service executing the one or more commands.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of non-transitory computer readable medium such as a storage device including RAM, ROM, a disk drive, a solid-state drive, or another tangible storage medium.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:

obtaining, by a proxy server, one or more commands to be executed for discovery of computing resources within a computing platform;

providing, by the proxy server, a representation of the one or more commands to a system management service within the computing platform, wherein the one or more commands instruct the system management service to store results of execution of the one or more commands in a storage service with the computing platform;

repeatedly querying, by the proxy server, the system management service for an indication that the execution of the one or more commands is complete; and retrieving, by the proxy server, results of the execution of the one or more commands from the storage service.

2. The method of claim 1, wherein the one or more commands are obtained from a database located within a managed network, and wherein the computing resources are located outside of the managed network but associated with the managed network.

3. The method of claim 2, further comprising:

writing, to the database, configuration items representing at least some of the results.

4. The method of claim 1, wherein the computing platform is a cloud-based system that provides the computing resources for use by an entity associated with the proxy server.

5. The method of claim 1, wherein the proxy server is located within the computing platform.

6. The method of claim 1, wherein the proxy server is located in a managed network, and wherein the computing resources are associated with the managed network.

7. The method of claim 1, wherein providing the representation of the one or more commands to the system management service is in response to determining that: the proxy server is configured to use the system management service for discovery, and the commands are associated with network addresses of agents operating in conjunction with the computing resources.

8. The method of claim 1, wherein the one or more commands includes a particular command that requires credentials of an application associated with the computing resources, and wherein providing the representation of the one or more commands to the system management service comprises:

obtaining the credentials;

uploading the credentials to a parameter store located within the computing platform; and informing the system management service of a location of the credentials within the parameter store.

9. The method of claim 1, wherein the one or more commands are in a form of a script, and wherein providing the representation of the one or more commands to the system management service comprises:

uploading the script to the storage service; and informing the system management service of a location of the script within the storage service.

10. The method of claim 1, wherein the indication that the execution of the one or more commands is complete includes a location of the results in the storage service, and wherein the proxy server retrieves the results of the execution from the location.

11. The method of claim 1, wherein the results include operational data or configuration data of the computing resources.

12. The method of claim 1, wherein repeatedly querying the system management service for the indication occurs asynchronously and in parallel to the system management service executing the one or more commands.

13. A non-transitory computer-readable medium, having stored thereon program instructions that, upon execution by a computing system, cause the computing system to perform operations comprising:

obtaining, by a proxy server, one or more commands to be executed for discovery of computing resources within a computing platform;

providing, by the proxy server, a representation of the one or more commands to a system management service within the computing platform, wherein the one or more commands instruct the system management service to store results of execution of the one or more commands in a storage service with the computing platform;

repeatedly querying, by the proxy server, the system management service for an indication that the execution of the one or more commands is complete; and retrieving, by the proxy server, results of the execution of the one or more commands from the storage service.

14. The non-transitory computer-readable medium of claim 13, wherein the one or more commands are obtained from a database located within a managed network, and wherein the computing resources are located outside of the managed network but associated with the managed network.

15. The non-transitory computer-readable medium of claim 14, the operations further comprising:

writing, to the database, configuration items representing at least some of the results.

16. The non-transitory computer-readable medium of claim 13, wherein providing the representation of the one or more commands to the system management service is in response to determining that: the proxy server is configured to use the system management service for discovery, and the commands are associated with network addresses of agents operating in conjunction with the computing resources.

17. The non-transitory computer-readable medium of claim 13, wherein the one or more commands includes a particular command that requires credentials of an application associated with the computing resources, and wherein providing the representation of the one or more commands to the system management service comprises:

obtaining the credentials;

uploading the credentials to a parameter store located within the computing platform; and informing the system management service of a location of the credentials within the parameter store.

18. The non-transitory computer-readable medium of claim 13, wherein the one or more commands are in a form of a script, and wherein providing the representation of the one or more commands to the system management service comprises:

uploading the script to the storage service; and informing the system management service of a location of the script within the storage service.

19. The non-transitory computer-readable medium of claim 13, wherein the indication that the execution of the one or more commands is complete includes a location of the results in the storage service, and wherein the proxy server retrieves the results of the execution from the location.

20. A system comprising:

one or more processors; and memory, containing program instructions that, upon execution by the one or more processors, cause the system to perform operations comprising:

obtaining, by a proxy server, one or more commands to be executed for discovery of computing resources within a computing platform;

providing, by the proxy server, a representation of the one or more commands to a system management service within the computing platform, wherein the one or more commands instruct the system management service to store results of execution of the one or more commands in a storage service with the computing platform;

repeatedly querying, by the proxy server, the system management service for an indication that the execution of the one or more commands is complete; and retrieving, by the proxy server, results of the execution of the one or more commands from the storage service.

* * * * *